(12) United States Patent
Park et al.

(10) Patent No.: US 8,711,251 B2
(45) Date of Patent: Apr. 29, 2014

(54) METHOD AND DEVICE FOR REDUCING IMAGE COLOR NOISE

(75) Inventors: Min-Kyu Park, Seoul (KR); Han-Sae Song, Seoul (KR); Hee-Chan Park, Seoul (KR); Young-Kwon Yoon, Seoul (KR); Youg-Gu Lee, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 452 days.

(21) Appl. No.: 13/045,110

(22) Filed: Mar. 10, 2011

(65) Prior Publication Data

US 2011/0221937 A1 Sep. 15, 2011

(30) Foreign Application Priority Data

Mar. 10, 2010 (KR) .................. 10-2010-0021218

(51) Int. Cl.
*H04N 5/217* (2011.01)

(52) U.S. Cl.
USPC ...................................... 348/241; 348/222.1

(58) Field of Classification Search
USPC ............... 348/222.1, 241, 252, 272–280; 382/162, 167, 260, 275, 266, 270, 272
See application file for complete search history.

(56) References Cited

U.S. PATENT DOCUMENTS

| | | | |
|---|---|---|---|
| 7,292,733 B2 | 11/2007 | Monobe et al. | |
| 7,453,504 B2 | 11/2008 | Ikeda | |
| 7,995,839 B2 | 8/2011 | Tanaka et al. | |
| 8,045,061 B2 | 10/2011 | Jang | |
| 2006/0291746 A1 | 12/2006 | Kang et al. | |
| 2007/0242875 A1* | 10/2007 | Tanaka et al. | 382/162 |
| 2009/0285480 A1* | 11/2009 | Bennett et al. | 382/167 |

FOREIGN PATENT DOCUMENTS

| | | |
|---|---|---|
| JP | 11-220744 | 8/1999 |
| JP | 2004-159311 | 6/2004 |
| JP | 2005-109991 | 4/2005 |
| JP | 2007-288439 | 11/2007 |
| KR | 1020060133773 | 12/2006 |
| KR | 1020090067911 | 6/2009 |

* cited by examiner

*Primary Examiner* — Nelson D. Hernández Hernández
(74) *Attorney, Agent, or Firm* — The Farrell Law Firm, P.C.

(57) ABSTRACT

A device and method for reducing color noise of an image by using a distance weight depending on a distance from a central pixel for each pixel of an image and an edge weight depending on the difference in luminance and chrominance with the central pixel is provided, which can effectively reduce the color noise of the image by using the correlation between the luminance and the chrominance and edge characteristics.

19 Claims, 4 Drawing Sheets

METHOD AND DEVICE FOR REDUCING IMAGE COLOR NOISE

PRIORITY

This application claims priority under 35 U.S.C. §119(a) to an application entitled "Method And Device For Reducing Image Color Noise" filed in the Korean Intellectual Property Office on Mar. 10, 2010 and assigned Serial No. 10-2010-0021218, the entire disclosure of which is incorporated herein by reference.

BACKGROUND OF THE INVENTION

1. Field of the Invention

The present invention relates generally to an image processing method and an image processing device, and more specifically, to a method and device for reducing image color noise captured by an image sensor.

2. Description of the Related Art

In general, a digital camera or a camcorder uses an image sensor, such as a Charge Coupled Device (CCD), a Complementary Metal Oxide Semiconductor (CMOS), or the like, instead of using film. The CCD is classified into a multiple CCD and a single CCD depending to the number of colors focused on a pixel. A multiple CCD can provide more accurate luminance and more accurate matching with a primary color for each pixel, as compared to a single CCD. However, the multiple CCD uses at least three times as many sensors as those used in the single CCD in order to detect each color component according to used color formats, such that the hardware architecture becomes complex and increases hardware size. For this reason, the single CCD has been predominantly used rather than the multiple CCD.

In the case of the single CCD, each pixel stores only one color information of the RGB color channels. Therefore, in order to obtain the complete information on images, the color information of other color channels that is not stored in the pixel should be interpolated from pixel information adjacent to the pixel. However, when unwanted information is interpolated during the interpolation process, noise or artifacts, which are largely unpleasant to the eye, are generated in images.

Therefore, in order to reduce the noise, research has been conducted in the field of image processing. A noise reducing algorithm may be classified into a method using a restoration mechanism, a method using a filtering mechanism, and the like. Since the restoration mechanism depends on accurate modeling for noise, excellent results are obtained but the burden on hardware is increased. Therefore, a method of using local probabilistic characteristics, for example, Local Linear Minimum Mean Square Error (LLMMSE), or the like, has been primarily used. A relatively simple bilateral filter approximating the LLMMSE, and the like, has been primarily used. The following Equation (1) is a general type of the LLMMSE:

$$\mathrm{out}[r][c] = \mathrm{mean}[r][c] + \frac{\mathrm{var}(in[r][c])}{\mathrm{var\_noise} + \mathrm{var}(in[r][c])}(in[r][c] - \mathrm{mean}[r][c])$$

where mean [r][c] represents the mean of (r,c) points, var (in[r][c]) represents variance of r, c points, and var_noise represents the variance of noise. In Equation (1), when the variance (var_noise) of noise is relatively larger than variance (var(in[r][c]) of signal, var (in[r][c])/(var_noise+var(in[r][c])) approximates "0" and the output out[r][c] approximates the mean accordingly, such that noise is reduced. On the other hand, when the variance of a signal is larger than the variance of a noise as in an edge region, var(in[r][c])/(var_noise+var (in[r][c])) approximates "1" and an output (out[r][c]) approximates an original signal in [r][c] accordingly, such that noise is less reduced.

An example of other color noise reducing filters may include a Mean Filter (MF), a Vector Median Filter (VMF), a Vector Directional Filter (VDF), and the like.

FIG. 1 is a diagram illustrating an example of MF, VMF, and VDF according to the related art. The MF depends on a method of obtaining a mean of pixel values in a local region. In FIG. 1, the MF result for three pixels having different directions and phases is $$MF = \left( \frac{R_1 + R_2 + R_3}{3}, \frac{G_1 + G_2 + G_3}{3}, \frac{B_1 + B_2 + B_3}{3} \right).$$

However, since the MF is a Low Pass Filter (LPF), in addition to noise, high frequency components necessary for images, such as an edge, is also reduced, such that the detail of images is reduced.

The median filter is a filter, which is efficient in reducing laplacian noise, which can efficiently reduce pixels in which colors are visually splashed. The VMF, which is a median filter, outputs a vector having an intermediate magnitude among color vectors in a local region as a result. For example, referring to FIG. 1, the VMF outputs a color value corresponding to $\vec{v}_3$ having an intermediate magnitude among color vectors $\vec{v}_1, \vec{v}_2, \vec{v}_3$ representing three pixels as a result. That is, the VMF outputs VMF=($R_3, G_3, B_3$) as a result.

The VDF is a filter that outputs a color vector having an intermediate phase among the color vectors in a local region as a result. For example, referring to FIG. 1, the VMF outputs a color value corresponding to $\vec{v}_2$ having an intermediate phase among color vectors $\vec{v}_1, \vec{v}_2, \vec{v}_3$ representing three pixels as a result. That is, the VMF outputs VDF=($R_2, G_2, B_2$) as a result.

As described above, the methods for reducing color noise, such as MF, VMF, VDF, or the like, according to the related art, uniformly reduce the color noise to the same degree without accurately considering the correlation between luminance Y of images and chrominance Cb and Cr of images and edge characteristics.

SUMMARY OF THE INVENTION

Accordingly, the present invention has been made to solve the above-mentioned problems occurring in the prior art, and the present invention provides a method and apparatus for reducing color noise capable of keeping a high frequency component necessary for an image such as an edge to vividly output the image by reducing color noise generated by an image sensor by using the correlation between luminance and chrominance and edge characteristics in order to provide a high definition image.

In accordance with an aspect of the present invention, there is provided a method for reducing color noise, including calculating a distance weight according to a distance from a central pixel to each pixel of an input image in a mask having a predetermined size; calculating an edge weight depending on a luminance and a chrominance between the central pixel and each pixel; calculating a weight mean of each pixel by using the calculated distance weight and edge weight; and correcting the luminance and the chrominance of each pixel by using the calculated weight mean.

In accordance with another aspect of the present invention, there is provided a device for reducing color noise, including a distance weight calculator calculating a distance weight according to a distance from a central pixel to each pixel of an input image in a mask having a predetermined size; an edge weight calculator calculating an edge weight depending on a luminance and a chrominance between the central pixel and each pixel; a weight mean calculator calculating a weight mean of each pixel by using the calculated distance weight and the edge weight; and a color noise reducing unit correcting the luminance and the chrominance of each pixel by using the calculated weight mean.

In accordance with another aspect of the present invention, there is provided an image photographing apparatus, including an image photographing unit photographing images and converting them into image signals; an image signal processor processing the images into image signals including luminance and chrominance; a device for reducing color noise correcting luminance and chrominance of each pixel by using a distance weight depending on a distance from a central pixel to each pixel of an input image and an edge weight depending on a difference in luminance and chrominance between the central pixel and each pixel of the image; a display unit outputting an image signal from which color noise is reduced; and a storage unit storing the image signal from which color noise is reduced.

As set forth above, since the present invention reduces the color noise generated by the image sensor using the correlation between luminance and chrominance and the edge characteristics, the high frequency components necessary for images, such as edges, are maintained to vividly represent the detailed portions, as compared to the method of uniformly reducing color noise by the average value in the relationship between the adjacent pixels.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Embodiments of the present invention will be described with reference to the accompanying drawings. In the following description, a detailed description of known functions and configurations incorporated herein will be omitted when it may make the subject matter of the present invention unclear. Further, various definitions found in the following description are provided only to help with a general understanding of the present invention, and it is apparent to those skilled in the art that the present invention can be implemented without such definitions.

Figure 1:
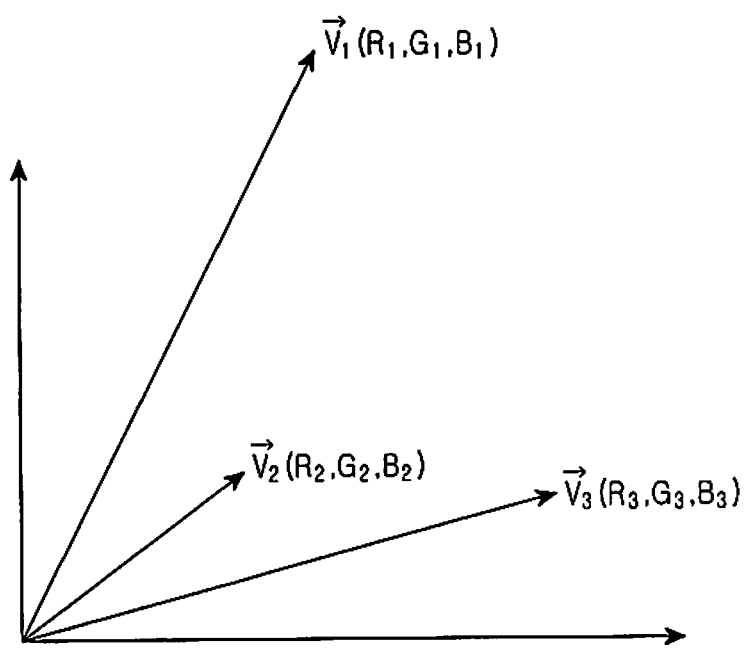
FIG. 1 is a diagram showing color vectors of three pixels having different directions and phases.
Figure 2:
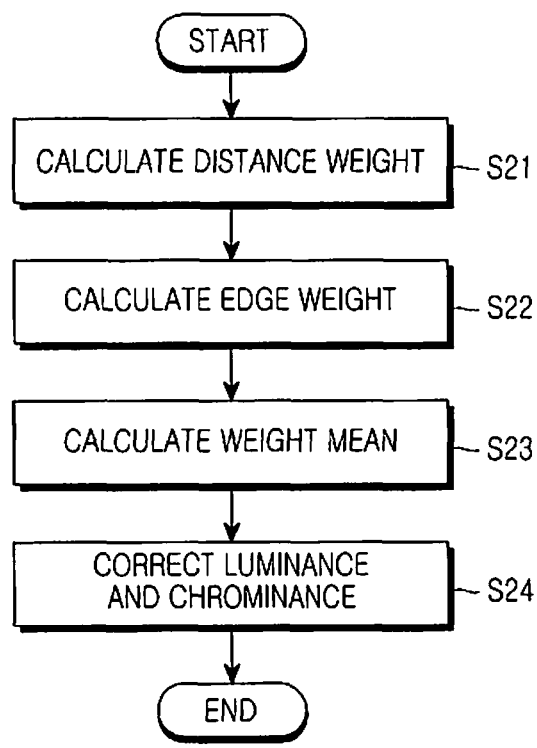
FIG. 2 is a flow chart showing each process in a method for reducing color noise according to an embodiment of the present invention.

FIG. 2 is a flow chart showing each process in a method for reducing color noise according to an embodiment of the present invention.

Referring to FIG. 2, the method for reducing color noise according to an embodiment of the present invention includes calculating a distance weight in step S21, calculating an edge weight in step S22, calculating a weight mean in step S23, and correcting luminance and chrominance in step S24. The method of reducing color noise uses the correlation between the luminance and the chrominance and edge characteristics, thereby making it possible to effectively reduce the color noise generated by an image sensor.

Specifically, in calculating the distance weight in step S21, the distance weight is calculated on the basis of coordinates of a central pixel within a mask having a predetermined size in an image. The predetermined size can be a pixel array of 5×5, 7×7, or the like. Provided that the coordinates of the central pixel within the mask having the predetermined size are ($r_c$, $c_c$) and the coordinates of the pixel to be calculated are (r,c), the distance weight is determined to be inversely proportional to the distance between the coordinates of each pixel to be calculated from the coordinates of the central pixel. Therefore, as the distance between the coordinates of the central pixel and the coordinates of each pixel to be calculated is increased, the distance weight is decreased.

An example of the distance weight $W_d(r,c)$ depending on the distance between the coordinates of the central pixel and the coordinates of each pixel will be described in the following Equation (2):

$$W_d(r, c) = \frac{1}{\sqrt{(r - r_c)^2 + (c - c_c)^2} + 1} \quad \text{Equation (2)}$$

As represented by Equation (2), the distance weight $W_d(r, c)$ may be determined to be in inverse proportion to the distance between the coordinates of the central pixel and the coordinates of the pixel to be calculated, that is, between the coordinates of each pixel. Additionally, the relationship between them may be represented in various forms.

The distance weight is introduced into the method to reduce color noise is to apply differentially the color noise reducing ratio depending on the distance from the central pixel, with respect to any two pixels where the luminance Y and the chrominance Cb and Cr are changed at the same ratio based on the central pixel.

Figure 3:
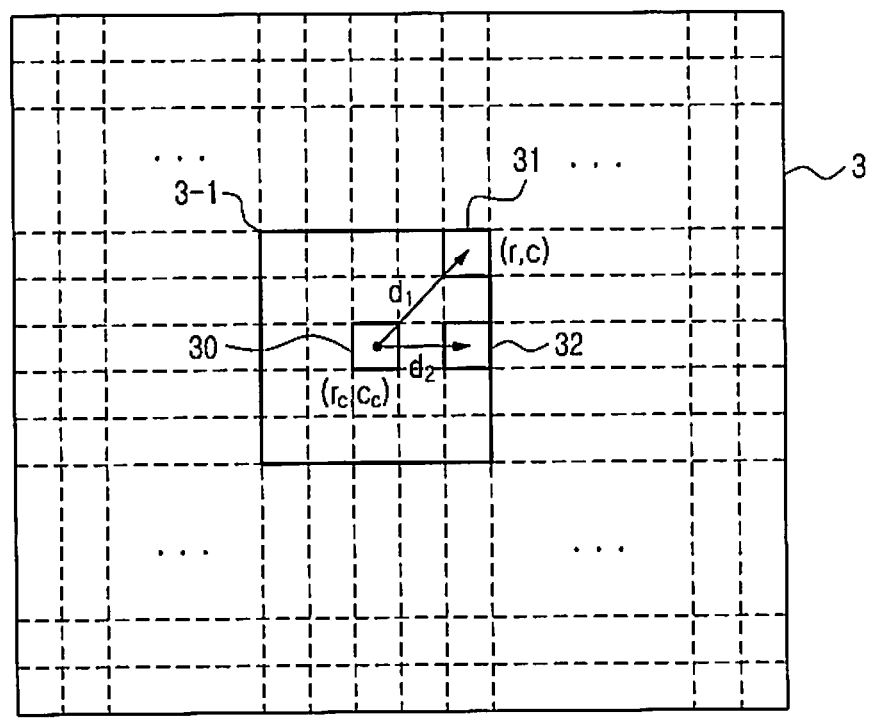
FIG. 3 is a diagram showing a distance weight according to the present invention.

In mask 3-1 (5×5 size) in an image 3 shown in FIG. 3, an example of two pixels 31 and 32 having different distances from central pixel 30 will be described. Provided that the distance weight of a first pixel 31 positioned at a place where the distance from the central pixel 30 is d1 is $W_{d1}$ and the distance weight of a second pixel 32 positioned at a place where the distance from the central pixel 30 is $d_2$ is $W_{d2}$, $W_{d1}$ has a value smaller than $W_{d2}$. Therefore, when YCbCr of the first pixel 31 and the second pixel 32 is changed at the same ratio in comparison with that of the central pixel 30, the color noise reducing ratio is different due to a different distance weight.

In calculating the edge weight in step S22, the edge weight is the difference in size between the luminance and the chrominance of the central pixel and the luminance and the chrominance of each pixel. The edge is a portion where the luminance or the chrominance is suddenly changed between adjacent pixels in the mask 3-1, that is, a portion corresponding to a contour of an object (for example, a person, animal, building, or the like) formed in the frame 3 corresponding to a subject.

In order to calculate the edge weight, an absolute value of the difference in size between the YCbCr components forming the central pixel and each pixel is first calculated. It is assumed that the luminance and the chrominance of the central pixel are $Y_{in}(r_c,c_c)$ and $Cb_{in}(r_2,c_c)$ and $Cr_{in}(r_c,c_c)$, respectively, and the luminance and the chrominance of each pixel are $Y_{bi}(r,c)$ and $Cb_{in}(r,c)$ and $Cr_{in}(r,c)$, respectively. In this case, the absolute values $D_Y$, $D_{Cb}$, and $D_C$ of the difference in the luminance and the chrominance between the central pixel and each pixel are represented by the following Equation (3).

$$D_Y = |Y_{in}(r_c,c_c) - Y_{in}(r,c)|$$

$$D_{Cb} = |Cb_{in}(r_c,c_c) - Cb_{in}(r,c)|$$

$$D_{Cr} = |Cr_{in}(r_c,c_c) - Cr_{in}(r,c)| \quad \text{Equation (3)}$$

Next, the edge weight $W_{e\_Y}(r,c)$ of the luminance Y, the edge weight $W_{e\_Cb}(r,c)$ of the chrominance Cb, and the edge weight $W_{e\_Cr}(r,c)$ of the chrominance Cr are calculated by using the absolute values $D_Y$, $D_{Cb}$, and $D_{Cr}$ depending on the difference in size of the calculated YCbCr signal. According to an embodiment of the present invention, the edge weights $W_{e\_Y}(r,c)$, $W_{e\_Cb}(r,c)$, and $W_{e\_Cr}(r,c)$ are calculated by the following Equation (4) depending on preset threshold values $th_{e\_Y}$, $th_{e\_Cb}$, and $th_{e\_Cr}$.

$$W_{e\_Y}(r,c) = \begin{cases} \dfrac{2}{\dfrac{D_Y}{th_{e\_Y}} + 1} - 1 & \text{if } D_Y \geq th_{e\_Y} \\ 0 & \text{otherwise} \end{cases} \quad \text{Equation (4)}$$

$$W_{e\_Cb}(r,c) = \begin{cases} \dfrac{2}{\dfrac{D_{Cb}}{th_{e\_Cb}} + 1} - 1 & \text{if } D_{Cb} \geq th_{e\_Cb} \\ 0 & \text{otherwise} \end{cases}$$

$$W_{e\_Cr}(r,c) = \begin{cases} \dfrac{2}{\dfrac{D_{Cr}}{th_{e\_Cr}} + 1} - 1 & \text{if } D_{Cr} \geq th_{e\_Cr} \\ 0 & \text{otherwise.} \end{cases}$$

In Equation (4), if the absolute value $D_Y$ is the threshold value $th_{e\_Y}$ or less, $0 \leq D_Y/th_{e\_Y} \leq 1$. The range of edge weight $W_{e\_Y}(r,c)$ value becomes $0 \leq W_{e\_Y}(r,c) \leq 1$. That is, when $D_Y = th_{e\_Y}$, $W_{e\_Y}(r,e) = 0$ and when $D_Y = 0$, $W_{e\_Y}(r,c) = 1$.

Similarly, if the absolute value $D_{Cb}$ is the threshold value $th_{e\_Cb}$ or less, $0 \leq D_{Cb}/th_{e\_Cb} \leq 1$ and the range of edge weight $W_{e\_Cb}(r,c)$ value becomes $0 \leq W_{e\_Cb}(r,c) \leq 1$. That is, when $D = th_{e\_Cb}$, $W_{e\_Cb}(r,c) = 0$ and when $D_{Cb} = 0$, $W_{e\_Cb}(r,c) = 1$.

Additionally, if the absolute value $D_{Cr}$ is the threshold value $th_{e\_Cr}$ or less, $0 \leq D_{Cr}/th_{e\_Cr} \leq 1$ and the range of edge weight $W_{e\_Cr}(r,c)$ value becomes $0 \leq W_{e\_Cr}(r,c) \leq 1$. That is, when $D_{Cr} = th_{e\_Cr}$, $W_{e\_Cr}(r,c) = 0$ and when $D_{Cr} = 0$, $W_{e\_Cr}(r,c) = 1$.

In calculating the weight mean in step S23, the weight mean of each pixel is calculated by using the calculated distance weight and the edge weight.

The weight mean according to the embodiment of the present invention is calculated using Equation (5):

$$Y_{wm\_y} = \frac{\sum_{y=-y_N}^{y_N} \sum_{c=-c_N}^{c_N} W_{e\_Y}(r,c) \times Y(r,c) \times W_d(r,c)}{\sum_{y=y_N}^{y_N} \sum_{c=-c_N}^{c_N} W_{e\_Y}(r,c) \times W_d(r,c)} \quad \text{Equation (5)}$$

$$Y_{wm\_ycbcr} = \frac{\sum_{y=-y_N}^{y_N} \sum_{c=-c_N}^{c_N} W_{e\_Y}(r,c) \times W_{e\_Cb}(r,c) \times W_{e\_Cr}(r,c) \times Y(r,c) \times W_d(r,c)}{\sum_{y=-y_N}^{y_N} \sum_{c=-c_N}^{c_N} W_{e\_Y}(r,c) \times W_{e\_Cb}(r,c) \times W_{e\_Cr}(r,c) \times W_d(r,c)}$$

$$Cb_{wm\_ycbcr} = \frac{\sum_{y=-y_N}^{y_N} \sum_{c=-c_N}^{c_N} W_{e\_Y}(r,c) \times W_{e\_Cb}(r,c) \times W_{e\_Cr}(r,c) \times Cb(r,c) \times W_d(r,c)}{\sum_{y=-y_N}^{y_N} \sum_{c=-c_N}^{c_N} W_{e\_Y}(r,c) \times W_{e\_Cb}(r,c) \times W_{e\_Cr}(r,c) \times W_d(r,c)}$$

$$Cr_{wm\_ycbcr} = \frac{\sum_{y=-y_N}^{y_N} \sum_{c=-c_N}^{c_N} W_{e\_Y}(r,c) \times W_{e\_Cb}(r,c) \times W_{e\_Cr}(r,c) \times Cr(r,c) \times W_d(r,c)}{\sum_{y=-y_N}^{y_N} \sum_{c=-c_N}^{c_N} W_{e\_Y}(r,c) \times W_{e\_Cb}(r,c) \times W_{e\_Cr}(r,c) \times W_d(r,c)}$$

As shown in Equation (5), the weight mean is calculated by the above four types and the weights of each edge are changed according to the type used. In Equation (5), N in $R_N$ and $C_N$ represents a serial number of each pixel in addition to the central pixel within one mask. For example, when the size of the mask is formed by a 5×5 pixel array, there will be 24 pixels other than the central pixel. Equation 5 represents each of 24 pixels to which an integer serial number is attached. The four types of weight means can calculate $Y_{wm\_y}$, $Y_{wm\_ycbcr}$, $Cb_{wm\_ycbcr}$, and $Cr_{wm\_ycbcr}$ from Equation (5).

In correcting of the luminance and the chrominance of each pixel in step S24, the color noise of the image is reduced by correcting the YCbCr of each pixel using the weight mean calculated at in step S23.

Generally, when the image signal is formed in an (Red Green Blue) (RGB) format, if the RGB components having any three pixels within the similar region are (R1, G1, B1), (R2, G2, B2), and (R3, G3, B3), respectively, the following Equation (6) of the pixels is established between the RGB components.

$$\frac{R_1}{G_1} \simeq \frac{R_2}{G_2} \simeq \frac{R_3}{G_3} \simeq K' \quad \text{Equation (6)}$$

$$\frac{B_1}{G_1} \simeq \frac{B_2}{G_2} \simeq \frac{B_3}{G_3} \simeq K''$$

$$\frac{B_1}{R_1} \simeq \frac{B_2}{R_2} \simeq \frac{B_3}{R_3} \simeq K'''$$

In Equation (6), K', K", and K"' represent any constant. Additionally, relationships in Equation (7) may be derived by modifying Equation (6).

$R_1-G_1 \cong R_2-G_2 \cong R_3-G_3 \cong K''''$ $B_1-G_1 \cong B_2-G_2 \cong B_3-G_3 \cong K'''''$ $B_1-R_1 \cong B_2-R_2 \cong B_3-R_3 \cong K''''''$  Equation (7)

In Equation (7), K'''', K''''', and K'''''' represent any constant. Additionally, the YCbCr format is transformed by using an RGB format and the relationship of Equation (7) may be applied to each component in the YCbCr format. In the YCbCr format, the relationship of each component is represented by Equation (8).

$Y_1-Cb_1 \cong Y_2-Cb_2 \cong Y_3-Cb_3 \cong K_1$ $Y_1-Cr_1 \cong Y_2-Cr_2 \cong Y_3-Cr_3 \cong K_2$  Equation (8)

In Equation (8), K1 and K2 represent any constant. The correlation between the YCbCr components of three pixels in Equation (8) is derived under the assumption that the three pixels are in similar regions. However, since the edge is actually present in the image and the pixel of the region having different characteristics is actually present in the image, the relationship of the following Equation (9) may be derived considering edge characteristics.

$Y_{out}-Cb_{out}=Y_{wm\_ycbcr}-Cb_{wm\_ycbcr}$ $Y_{out}-Cr_{out}=Y_{wm\_ycbcr}-Cr_{wm\_ycbcr}$  Equation (9)

If Equation (9) is arranged depending on $Cb_{out}$ and $Cr_{out}$, it becomes Equation (10).

$Cb_{out}=Cb_{wm\_ycbcr}-(Y_{wm\_ycbcr}-Y_{out})$ $Cr_{out}=Cr_{wm\_ycbcr}-(Y_{wm\_ycbcr}-Y_{out})$  Equation (10)

By replacing $Y_{out}$ with $Y_{w\_y}$ and imparting the weight to $(Y_{wm\_ycbcr})$, Equation (10) can be converted to Equation (11).

$Cb_{out}=Cb_{wm\_ycbcr}-W_{cb} \times (Y_{wm\_ycbcr}-Y_{wm\_y})$ $Cr_{out}=Cr_{wm\_ycbcr}-W_{cr} \times (Y_{wm\_ycbcr}-Y_{wm\_y})$  Equation (11)

In Equation (11), $W_{Cb}$, and $W_{Cr}$ are a preset weight. Cb component and Cr component from which noise is finally reduced by Equation (11) is obtained. As described above, the method for reducing color noise of an image may be implemented by reflecting the distance weight and the edge weight through steps S21 to S24. The present invention provides a method for more effectively reducing color noise of an image than the existing methods using only color information Cb and Cr, thereby making it possible to more efficiently reduce color noise at the time of photographing images under a low luminance environment.

Figure 4:
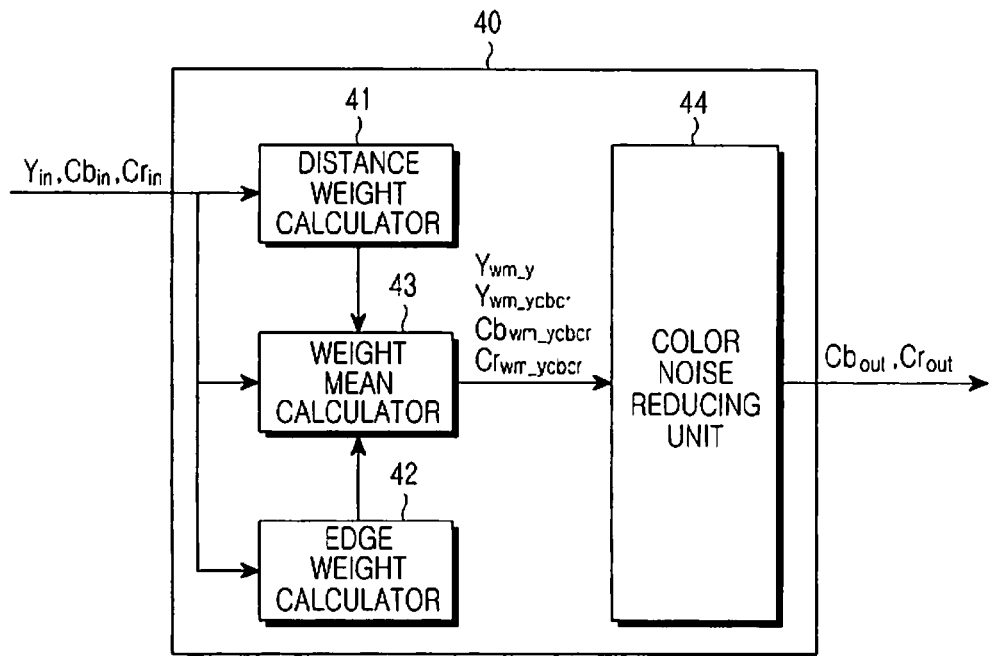
FIG. 4 is a diagram showing a device for reducing color noise according to an embodiment of the present invention.

FIG. 4 is a diagram showing a device for reducing color noise according to an embodiment of the present invention.

As shown in FIG. 4, a device for reducing color noise of an image according to an embodiment of the present invention includes a distance weight calculator 41, an edge weight calculator 42, a weight mean calculator 43, and a color noise reducing unit 44.

The distance weight calculator 41 calculates a distance weight depending on a distance from the central pixel in the mask having a predetermined size to each pixel in the mask in the input image. The predetermined size implies a pixel array of 5×5, 7×7, or the like. Provided that the coordinates of the central pixel within the mask having the predetermined size are $(r_c, c_c)$ and the coordinates of the pixel to be calculated are $(r, c)$, the distance weight is determined to be in inverse proportion to the distance between the coordinates of each pixel to be calculated from the coordinates of the central pixel.

Therefore, as the distance between the coordinates of the central pixel and the coordinates of each pixel to be calculated is increased, the distance weight becomes smaller.

An example of the distance weight $W_d(r,c)$ depending on the distance between the coordinates of the central pixel and the coordinates of each pixel was described in Equation (2) above.

As represented by Equation (2), the distance weight $W_d(r, c)$ may be determined to be in inverse proportion to the distance between the coordinates of the central pixel and the coordinates of the pixel to be calculated, that is, between the coordinates of each pixel. Additionally, the relationship between them may be represented by various forms.

The reason the distance weight is introduced into the method for reducing color noise is to apply the color noise reducing ratio differentially according to the distance from the central pixel, with respect to any two pixels where the luminance Y and the chrominance Cb and Cr are changed at the same ratio based on the central pixel.

The edge weight calculator 42 calculates the edge weight depending on the difference in size between the luminance and the chrominance of the central pixel and the luminance and the chrominance of every other pixel.

In order to calculate the edge weight, an absolute value of the difference in size between the YCbCr components forming the central pixel and each pixel is first calculated. It is assumed that the luminance and the chrominance of the central pixel are $Y_{in}(r_c,c_c)$ and $Cb_{in}(r_c,c_c)$ and $Cr_{in}(r_c,c_c)$, respectively, and the luminance and the chrominance of each pixel are $Y_{in}(r,c)$ and $Cb_{in}(r,c)$ and $Cr_{in}(r,c)$, respectively. In this case, absolute values $D_Y$, $D_{Cb}$, and $D_{Cr}$ of the difference in the luminance and the chrominance between the central pixel and each pixel were described in Equation (3).

Next, the edge weight $W_{e\_Y}(r,c)$ of luminance Y, the edge weight $W_{e\_Cb}(r,c)$ of the chrominance Cb, and the edge weight $W_{e\_Cr}(r,c)$ of the chrominance Cr are calculated by using the absolute values $D_Y$, $D_{Cb}$, and $D_{Cr}$ according to the difference in size of the calculated YCbCr signal.

Equation (4) describes the edge weights $W_{e\_Y}(r,c)$, $W_{e\_Cb}(r,c)$, and $W_{e\_Cr}(r,c)$ calculated depending on the preset threshold values $th_{e\_Y}$, $th_{e\_Cb}$, and $th_{e\_Cr}$.

In Equation (4), if absolute value $D_Y$ is threshold value $th_{e\_Y}$ or less, $0 \le D_Y/th_{e\_Y} \le 1$. The range of edge weight $W_{e\_Y}(r,c)$ value becomes $0 \le W_{e\_Y}(r,c) \le 1$. That is, when $D_Y=th_{e\_Y}$, $W_{e\_Y}(r,c)=0$ and when $D_Y=0$, $W_{e\_Y}(r,c)=1$.

Similarly, if the absolute value $D_{Cb}$ is the threshold value $th_{e\_Cb}$ or less, $0 \le D_{Cb}/th_{e\_Cb} \le 1$ and the range of edge weight $W_{e\_Cb}(r,c)$ value becomes $0 \le W_{e\_Cb}(r,c) \le 1$. That is, when $D_{Cb}=th_{e\_Cb}$, $W_{e\_Cb}(r,c)=0$ and when $D_{Cb}=0$, $W_{e\_Cb}(r,c)=1$.

Additionally, if the absolute value $D_{Cr}$ is the threshold value $th_{e\_Cr}$ or less, $0 \le D_{Cr}/th_{e\_Cr} \le 1$ and the range of edge weight $W_{e\_Cr}(r,c)$ value becomes $0 \le W_{e\_Cr}(r,c) \le 1$. That is, when $D_{Cr}=th_{e\_Cr}$, $W_{e\_Cr}(r,c)=0$ and when $D_{Cr}=0$, $W_{e\_Cr}(r,c)=1$.

The weight mean calculator 43 calculates the mean weight of each pixel by using the calculated distance weight and the edge weight.

As described above, the weight mean according to the embodiment of the present invention is calculated according to Equation (5). As noted in Equation (5), the mean weight is calculated by depending on the above four types and the weights of each edge are changed according to whether any one of the four types is used. In Equation (5), N in $R_N$ and the $C_N$ represents a serial number of each pixel in addition to the central pixel within one mask. For example, when the size of the mask is formed by a 5×5 pixel array, there are 24 pixels other than the central pixel. Equation (5) represents each of 24 pixels to which an integer serial number is attached. The four types of mean weights can calculate $Y_{wm\_y}$, $Y_{wm\_ycbcr}$, $Cb_{wm\_y}$, $Cb_{wm\_ycbcr}$, and $Cr_{wm\_ycbcr}$ from Equation (5).

The color noise reducing unit 44 reduces the color noise of the image by correcting the luminance (Y) and the chrominance (Cb, Cr) of each pixel by using the calculated weight mean.

The relationship between each component of YCbCr format is derived from the relationship between each component of the RGB format in a similar region depending on Equations (6) to (8). However, since the edge may be substantially present in the image and the pixel of the region having different characteristics may be substantially present therein, the relationship of each component of YCbCr is derived from Equations (9) and (10) considering the edge characteristics and Equation (11) is finally derived by replacing $Y_{out}$ with $Y_{wm\_y}$ and imparting a weight to $(Y_{wm\_ycbcr}-Y_{out})$ in Equation (10).

That is, the Cb component and Cr component, from which color noise is reduced, is obtained by using the predetermined weights $W_{Cb}$ and $W_{Cr}$.

As described above, the apparatus for reducing color noise of an image according to the embodiment of the present invention can more effectively reduce the color noise of the image than the method using only the color information Cb and Cr according to the related art, thereby making it possible to more efficiently reduce the color noise at the time of photographing images under a low luminance environment.

Figure 5:
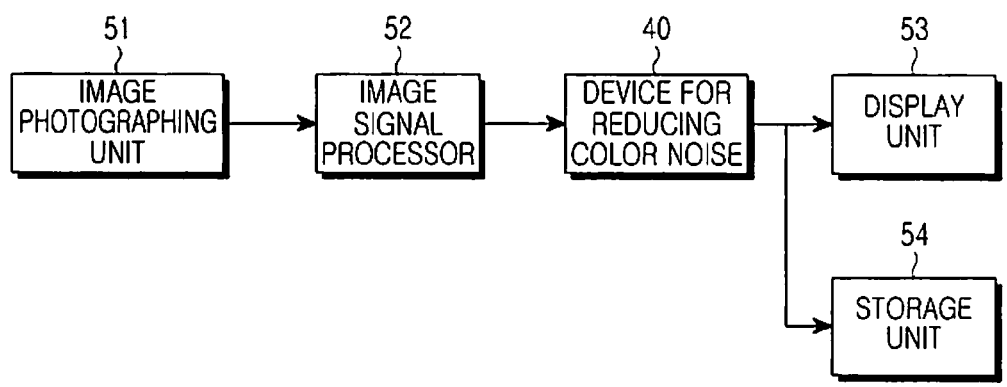
FIG. 5 is a diagram showing an image photographing apparatus according to an embodiment of the present invention.

FIG. 5 is a diagram showing an image photographing apparatus according to an embodiment of the present invention.

Referring to FIG. 5, the image photographing apparatus according to an embodiment of the present invention includes an image photographing unit 51, an Image Signal Processor (ISP) 52, a device for reducing color noise 40, a display unit 53, and a storage unit 54.

The image photographing unit 51 photographs an image for a subject and converts it into an image signal. The image photographing unit includes a lens unit (not shown), an infrared blocking filter unit (not shown), and an image sensor (not shown).

The lens unit includes a plurality of lenses. Additionally, each of the plurality of lenses has a rotational symmetry with respect to an optical axis and the optical axes of the plurality of lenses are arranged on a single axis. The plurality of lenses may be formed in a spherical or an aspherical shape. The lens unit may be formed of three lenses made of a plastic material.

The infrared blocking filter unit serves to block incident light in an infrared band, which the human eye cannot see. The image sensor sensitively responds to the incident light of the infrared band (ray having about 750 nm of wavelength) that is not recognized by the human eye. Therefore, since the image photographed by the image sensor would be changed due to the incident light of the infrared band, the infrared blocking filter is used in order to block the incident light of the infrared band.

The image sensor has a structure where the pixels having the same configuration are disposed in an N×M matrix structure. An example of the image sensor may include a CCD, a CMOS, or the like. The image sensor is operated under a principle of producing color images by disposing a three primary filter in front of the image sensor and storing information passing through it and then summing it with the stored shading information in the image sensor.

The ISP 52 is an apparatus for converting the electrical signal converted in the image sensor into the image signal. The image signal processor may be implemented in one chip when the image sensor is a CMOS and may be disposed in a chip in a DSP and SoC type. Special functions, such as a handshake preventing function, a low luminance compensating function, or the like may be implemented.

A device for reducing color noise 40 includes a distance weight calculator, an edge weight calculator, a weight mean calculator, and a color noise reducing unit and includes the same components as the device for reducing color noise in FIG. 4.

The display unit 53 displays the image of the subject to be photographed or displays stored images. The display unit 53 may be implemented using a Liquid Crystal Display (LCD), a Light Emitting Diode (LED), an Organic Light Emitting Diode (OLED), or the like.

The storage unit 54 stores the image signal data photographed by the image photographing unit 51. Additionally, the storage unit 54 may store a general program and applications for driving the image photographing apparatus. In particular, the storage unit 54 can store the above equations required to drive the device for reducing color noise included in the image photographing apparatus and store an input/output look-up table corresponding to the equation, such that the output values corresponding to the input values can also refer to the look-up table.

As described above, the image photographing apparatus according to the embodiment of the present invention can more effectively reduce color noise of the image than a method using only the color information Cb and Cr according to the related art, thus making it possible to more efficiently reduce the color noise at the time of photographing images under a low luminance environment.

Embodiments of the present invention may be implemented in the form of hardware, software, and a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of erasability or re-recordability. It can also be appreciated that the storage device and the storage medium are embodiments of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for reducing color noise of an input image, comprising:

calculating, by a noise reduction device, a distance weight according to a distance from the coordinates of a central pixel to the coordinates of each pixel of the input image in a mask having a predetermined size;

calculating, by the noise reduction device, an edge weight depending on a luminance and a chrominance between the central pixel and each pixel;

calculating, by the noise reduction device, a weight mean of each pixel by using the calculated distance weight and the edge weight;

correcting, by the noise reduction device, the luminance and the chrominance of each pixel by using the calculated weight mean; and storing, in a non-transitory memory, a noise-reduced image generated by the correction of the luminance and the chrominance of each pixel.

2. The method of claim 1, wherein if the coordinates of the central pixel are $(r_c,c_c)$, the coordinates of each pixel are $(r,c)$, and the distance weight of each pixel is $W_d(r,c)$, the distance weight is calculated by $$W_d(r,c) = \frac{1}{\sqrt{(r-r_c)^2 + (c-c_c)^2} + 1}.$$

3. The method of claim 1, wherein if the luminance of the central pixel is $Y_{in}(r_c,c_c)$, the chrominance is $Cb_{in}(r_c,c_c)$ and $Cr_{in}(r_c,c_c)$, the luminance of each pixel is $Y_{in}(r,c)$, the chrominance of each pixel is $Cb_{in}(r,c)$ and $Cr_{in}(r,c)$, the absolute value of the difference in the luminance and the chrominance between the central pixel and each pixel $$D_Y = |Y_{in}(r_c,c_c) - Y_{in}(r,c)|$$

$$D_{Cb} = |Cb_{in}(r_c,c_c) - Cb_{in}(r,c)|$$

is $D_{Cr} = |Cr_{in}(r_c,c_c) - Cr_{in}(r,c)|$, and the edge weight of luminance and the edge weight of chrominance for the threshold value $th_{e\_Y}$, $th_{e\_Cb}$, and $th_{e\_Cr}$ is $W_{e\_Cb}(r,c)$ and $W_{e\_Cr}(r,c)$, respectively, the edge weight is calculated by $$W_{e\_Y}(r,c) = \begin{cases} \dfrac{2}{\dfrac{D_Y}{th_{e\_Y}} + 1} - 1 & \text{if } D_Y \geq th_{e\_Y} \\ 0 & \text{otherwise} \end{cases}$$

$$W_{e\_Cb}(r,c) = \begin{cases} \dfrac{2}{\dfrac{D_{Cb}}{th_{e\_Cb}} + 1} - 1 & \text{if } D_{Cb} \geq th_{e\_Cb} \\ 0 & \text{otherwise} \end{cases}$$

$$W_{e\_Cr}(r,c) = \begin{cases} \dfrac{2}{\dfrac{D_{Cr}}{th_{e\_Cr}} + 1} - 1 & \text{if } D_{Cr} \geq th_{e\_Cr} \\ 0 & \text{otherwise.} \end{cases}$$

4. The method of claim 1, wherein the weight mean $Y_{wm\_y}$, $Y_{wm\_ycbcr}$, $Cb_{wm\_ycbcr}$, and $Cr_{wm\_ycbcr}$ is calculated by $$Y_{wm\_y} = \frac{\sum_{y=-y_N}^{y_N} \sum_{c=-c_N}^{c_N} W_{e\_Y}(r,c) \times Y(r,c) \times W_d(r,c)}{\sum_{y=y_N}^{y_N} \sum_{c=-c_N}^{c_N} W_{e\_Y}(r,c) \times W_d(r,c)}$$

$$Y_{wm\_ycbcr} = \frac{\sum_{y=-y_N}^{y_N} \sum_{c=-c_N}^{c_N} W_{e\_Y}(r,c) \times W_{e\_Cb}(r,c) \times W_{e\_Cr}(r,c) \times Y(r,c) \times W_d(r,c)}{\sum_{y=-y_N}^{y_N} \sum_{c=-c_N}^{c_N} W_{e\_Y}(r,c) \times W_{e\_Cb}(r,c) \times W_{e\_Cr}(r,c) \times W_d(r,c)}$$

$$Cb_{wm\_ycbcr} = \frac{\sum_{y=-y_N}^{y_N} \sum_{c=-c_N}^{c_N} W_{e\_Y}(r,c) \times W_{e\_Cb}(r,c) \times W_{e\_Cr}(r,c) \times Cb(r,c) \times W_d(r,c)}{\sum_{y=-y_N}^{y_N} \sum_{c=-c_N}^{c_N} W_{e\_Y}(r,c) \times W_{e\_Cb}(r,c) \times W_{e\_Cr}(r,c) \times W_d(r,c)}$$

$$Cr_{wm\_ycbcr} = \frac{\sum_{y=-y_N}^{y_N} \sum_{c=-c_N}^{c_N} W_{e\_Y}(r,c) \times W_{e\_Cb}(r,c) \times W_{e\_Cr}(r,c) \times Cr(r,c) \times W_d(r,c)}{\sum_{y=-y_N}^{y_N} \sum_{c=-c_N}^{c_N} W_{e\_Y}(r,c) \times W_{e\_Cb}(r,c) \times W_{e\_Cr}(r,c) \times W_d(r,c)}.$$

5. The method of claim 4, wherein the calculated $Y_{wm\_y}$ is output as the chrominance of each pixel and the chrominance $Cb_{out}$ and $Cr_{out}$ of each pixel is calculated $$Cb_{out} = Cb_{wm\_ycbcr} - W_{cb} \times (Y_{wm\_ycbcr} - Y_{wm\_y})$$

by $Cr_{out} = Cr_{wm\_ycbcr} - W_{cr} \times (Y^{wm}{}_{ycbcr} - Y_{wm\_y})$ and is output if the preset weight is $W_{cb}$ and $W_{cr}$.

6. The method of claim 1, wherein the weight mean of each pixel is calculated by using arithmetic operation of the distance weight and the edge weight.

7. A device for reducing color noise of an input image, comprising:

a noise reduction device calculating a distance weight according to a distance from the coordinates of a central pixel to the coordinates of each pixel of the input image in a mask having a predetermined size, calculating an edge weight depending on luminance and chrominance between the central pixel and each pixel, calculating a weight mean of each pixel by using the calculated distance weight and the edge weight, and correcting the luminance and the chrominance of each pixel by using the calculated weight mean; and a non-transitory memory storing a noise-reduced image generated by the correction of the luminance and the chrominance of each pixel.

8. The device of claim 7, wherein if the coordinates of the central pixel are $(r_c,c_c)$, the coordinates of each pixel are $(r,c)$, and the distance weight of each pixel is $W_d(r,c)$, the distance weight is calculated by $$W_d(r,c) = \frac{1}{\sqrt{(r-r_c)^2 + (c-c_c)^2} + 1}.$$

9. The device of claim 7, wherein if the luminance of the central pixel is $Y_{in}(r_c,c_c)$, the chrominance is $Cb_{in}(r_c,c_c)$ and $Cr_{in}(r_c,c_c)$, the luminance of each pixel is $Y_{in}(r,c)$, the chrominance of each pixel is $Cb_{in}(r,c)$ and $Cr_{in}(r,c)$, the absolute value of the difference in the luminance and the chrominance between the central pixel and each pixel $$D_y = |Y_{in}(r_c, c_c) - Y_{in}(r, c)|$$

$$D_{Cb} = |Cb_{in}(r_c, c_c) - Cb_{in}(r, c)|$$

is $D_{Cr} = |Cr_{in}(r_c, c_c) - Cr_{in}(r, c)|$, and the edge weight of luminance and the edge weight of chrominance for the threshold value $th_{e\_y}$, $th_{e\_Cb}$, and $th_{e\_Cr}$ is $W_{e\_Cb}(r, c)$ and $W_{e\_Cr}(r, c)$, respectively, the edge weight is calculated by $$W_{e\_Y}(r, c) = \begin{cases} \dfrac{2}{\frac{D_Y}{th_{e\_Y}} + 1} - 1 & \text{if } D_Y \geq th_{e\_Y} \\ 0 & \text{otherwise} \end{cases}$$

$$W_{e\_Cb}(r, c) = \begin{cases} \dfrac{2}{\frac{D_{Cb}}{th_{e\_Cb}} + 1} - 1 & \text{if } D_{Cb} \geq th_{e\_Cb} \\ 0 & \text{otherwise} \end{cases}$$

$$W_{e\_Cr}(r, c) = \begin{cases} \dfrac{2}{\frac{D_{Cr}}{th_{e\_Cr}} + 1} - 1 & \text{if } D_{Cr} \geq th_{e\_Cr} \\ 0 & \text{otherwise.} \end{cases}$$

10. The device of claim 9, wherein the weight mean $Y_{wm\_y}$, $Y_{wm\_ycbcr}$, $Cb_{wm\_ycbcr}$, and $Cr_{wm\_ycbcr}$ is calculated by $$Y_{wm\_y} = \frac{\sum_{y=-y_N}^{y_N} \sum_{c=-c_N}^{c_N} W_{e\_Y}(r, c) \times Y(r, c) \times W_d(r, c)}{\sum_{y=-y_N}^{y_N} \sum_{c=-c_N}^{c_N} W_{e\_Y}(r, c) \times W_d(r, c)}$$

$$Y_{wm\_ycbcr} = \frac{\sum_{y=-y_N}^{y_N} \sum_{c=-c_N}^{c_N} W_{e\_Y}(r, c) \times W_{e\_Cb}(r, c) \times W_{e\_Cr}(r, c) \times Y(r, c) \times W_d(r, c)}{\sum_{y=-y_N}^{y_N} \sum_{c=-c_N}^{c_N} W_{e\_Y}(r, c) \times W_{e\_Cb}(r, c) \times W_{e\_Cr}(r, c) \times W_d(r, c)}$$

$$Cb_{wm\_ycbcr} = \frac{\sum_{y=-y_N}^{y_N} \sum_{c=-c_N}^{c_N} W_{e\_Y}(r, c) \times W_{e\_Cb}(r, c) \times W_{e\_Cr}(r, c) \times Cb(r, c) \times W_d(r, c)}{\sum_{y=-y_N}^{y_N} \sum_{c=-c_N}^{c_N} W_{e\_Y}(r, c) \times W_{e\_Cb}(r, c) \times W_{e\_Cr}(r, c) \times W_d(r, c)}$$

$$Cr_{wm\_ycbcr} = \frac{\sum_{y=-y_N}^{y_N} \sum_{c=-c_N}^{c_N} W_{e\_Y}(r, c) \times W_{e\_Cb}(r, c) \times W_{e\_Cr}(r, c) \times Cr(r, c) \times W_d(r, c)}{\sum_{y=-y_N}^{y_N} \sum_{c=-c_N}^{c_N} W_{e\_Y}(r, c) \times W_{e\_Cb}(r, c) \times W_{e\_Cr}(r, c) \times W_d(r, c)}$$

11. The device of claim 10, wherein the calculated $Y_{wm\_y}$ is output as the luminance of each pixel and the chrominance $Cb_{out}$ and $Cr_{out}$ of each pixel are $$Cb_{out} = Cb_{wm\_ycbcr} - W_{cb} \times (Y_{wm\_ycbcr} - Y_{wm\_y})$$

calculated depending on $Cr_{out} = Cr_{wm\_ycbcr} - W_{cr} \times (Y_{wm\_ycbcr} - Y_{wm\_y})$ and is output if the preset weight is $W_{Cb}$ and $W_{cr}$.

12. The device of claim 7, wherein the weight mean of each pixel is calculated by using arithmetic operation of the distance weight and the edge weight.

13. An image photographing apparatus, comprising:
an image photographing unit photographing images and converting them into image signals;
an image signal processor processing the images into image signals including luminance and chrominance;
a device for reducing color noise correcting luminance and chrominance of each pixel by using a distance weight depending on a distance from the coordinates of a central pixel to the coordinates of each pixel of an input image and an edge weight depending on a difference in luminance and chrominance between the central pixel and each pixel of the image;
a display unit outputting an image signal from which color noise is reduced; and a storage unit storing the image signal from which color noise is reduced.

14. The apparatus of claim 13, wherein the device for reducing color noise comprises:
a distance weight calculator calculating a distance weight according to a distance from a central pixel to each pixel of an input image;
an edge weight calculator calculating an edge weight depending on luminance and chrominance between the central pixel and each pixel of the image;
a weight mean calculator calculating a weight mean of each pixel by using the calculated distance weight and the edge weight; and
a color noise reducing unit correcting the luminance and the chrominance of each pixel by using the calculated weight mean.

15. The apparatus of claim 13, wherein if the coordinates of the central pixel are $(r_c, c_c)$, the coordinates of each pixel are $(r, c)$, and the distance weight of each pixel is $W_d(r, c)$, the distance weight is calculated by $$W_d(r, c) = \frac{1}{\sqrt{(r - r_c)^2 + (c - c_c)^2} + 1}.$$

16. The apparatus of claim 13, wherein if the luminance of the central pixel is $Y_{in}(r_c, c_c)$, the chrominance is $Cb_{in}(r_c, c_c)$ and $Cr_{in}(r_c, c_c)$, the luminance of each pixel is $Y_{in}(r, c)$, the chrominance of each pixel is $Cb_{in}(r, c)$ and $Cr_{in}(r, c)$, the absolute value of the difference in the luminance and the chrominance between the central pixel and $$D_y = |Y_{in}(r_c, c_c) - Y_{in}(r, c)|$$

$$D_{Cb} = |Cb_{in}(r_c, c_c) - Cb_{in}(r, c)|$$

each pixel is $D_{Cr} = |Cr_{in}(r_c, c_c) - Cr_{in}(r, c)|$, and the edge weight of luminance and the edge weight of chrominance for the threshold value $th_{e\_y}$, $th_{e\_Cb}$, and $th_{e\_Cr}$ is $W_{e\_Cb}(r, c)$ and $W_{e\_Cr}(r, c)$, respectively, the edge weight is calculated by $$W_{e\_Y}(r, c) = \begin{cases} \dfrac{2}{\frac{D_Y}{th_{e\_Y}} + 1} - 1 & \text{if } D_Y \geq th_{e\_Y} \\ 0 & \text{otherwise} \end{cases}$$

-continued $$W_{e\_Cb}(r, c) = \begin{cases} \dfrac{2}{\dfrac{D_{Cb}}{th_{e\_Cb}} + 1} - 1 & \text{if } D_{Cb} \geq th_{e\_Cb} \\ 0 & \text{otherwise} \end{cases}$$

$$W_{e\_Cr}(r, c) = \begin{cases} \dfrac{2}{\dfrac{D_{Cr}}{th_{e\_Cr}} + 1} - 1 & \text{if } D_{Cr} \geq th_{e\_Cr} \\ 0 & \text{otherwise.} \end{cases}$$

17. The apparatus of claim 16, wherein the weight mean $Y_{wm\_y}, Y_{wm\_ycbcr}, Cb_{wm\_ycbcr},$ and $Cr_{wmycbcr}$ is calculated by $$Y_{wm\_y} = \frac{\sum_{y=-y_N}^{y_N} \sum_{c=-c_N}^{c_N} W_{e\_Y}(r, c) \times Y(r, c) \times W_d(r, c)}{\sum_{y=y_N}^{y_N} \sum_{c=-c_N}^{c_N} W_{e\_Y}(r, c) \times W_d(r, c)}$$

$$Y_{wm\_ycbcr} = \frac{\sum_{y=-y_N}^{y_N} \sum_{c=-c_N}^{c_N} W_{e\_Y}(r, c) \times}{\sum_{y=-y_N}^{y_N} \sum_{c=-c_N}^{c_N} W_{e\_Y}(r, c) \times W_{e\_Cb}(r, c) \times W_{e\_Cr}(r, c) \times W_d(r, c)}$$

$$Cb_{wm\_ycbcr} = \frac{\sum_{y=-y_N}^{y_N} \sum_{c=-c_N}^{c_N} W_{e\_Y}(r, c) \times}{\sum_{y=-y_N}^{y_N} \sum_{c=-c_N}^{c_N} W_{e\_Y}(r, c) \times W_{e\_Cb}(r, c) \times W_{e\_Cr}(r, c) \times W_d(r, c)}$$

$$Cr_{wm\_ycbcr} = \frac{\sum_{y=-y_N}^{y_N} \sum_{c=-c_N}^{c_N} W_{e\_Y}(r, c) \times}{\sum_{y=-y_N}^{y_N} \sum_{c=-c_N}^{c_N} W_{e\_Y}(r, c) \times W_{e\_Cb}(r, c) \times W_{e\_Cr}(r, c) \times W_d(r, c)}.$$

18. The apparatus of claim 17, wherein the calculated $Y_{wm\_y}$ is output as the luminance of each pixel and the chrominance $Cb_{out}$ and $Cr_{out}$ of each pixel is $$Cb_{out} = Cb_{wm\_ycbcr} - W_{cb} \times (Y_{wm\_ycbcr} - Y_{wm\_y})$$

calculated by $Cr_{out} = Cr_{wm\_ycbcr} - W_{cr} \times (Y^{wm}{}_{\_ycbcr} - Y_{wm\_y})$ and is output if the preset weight is $W_{Cb}$ and $W_{Cr}$.

19. The apparatus of claim 14, wherein the weight mean of each pixel is calculated by using arithmetic operation of the distance weight and the edge weight.

\* \* \* \* \*